United States Patent
Buss et al.

(10) Patent No.: US 7,383,678 B2
(45) Date of Patent: Jun. 10, 2008

(54) REAR DISCHARGE MOWER DECK HAVING NON-VERTICAL FAN SPINDLE

(75) Inventors: Steven Henry Buss, Horicon, WI (US); Michael P. Schemelin, West Bend, WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/739,831

(22) Filed: Apr. 25, 2007

(65) Prior Publication Data

US 2007/0193244 A1 Aug. 23, 2007

Related U.S. Application Data

(62) Division of application No. 11/250,584, filed on Oct. 13, 2005, now Pat. No. 7,240,474.

(51) Int. Cl.
*A01D 87/10* (2006.01)
(52) U.S. Cl. ..................................... 56/13.3
(58) Field of Classification Search ................ 56/13.4, 56/1.28, 13.3, 16.7, 320.2, DIG. 20
See application file for complete search history.

(56) References Cited

U.S. PATENT DOCUMENTS

| | | | |
|---|---|---|---|
| 2,920,435 A | 1/1960 | Vallone | 56/13.3 |
| 2,957,295 A | 10/1960 | Brown | 56/25.4 |
| 3,008,283 A | 11/1961 | Wood | 56/17.4 |
| 3,420,041 A | 1/1969 | Irgens | 56/320.2 |
| 4,081,947 A | 4/1978 | Szymanis | 56/13.3 |
| 4,114,353 A | 9/1978 | Ansbaugh et al. | 56/13.3 |
| 4,121,405 A | 10/1978 | Wolf | 56/12.9 |
| 4,263,771 A | 4/1981 | Iaboni et al. | 56/13.4 |
| 4,407,112 A | 10/1983 | Shepherd et al. | 56/13.4 |
| 4,472,926 A | 9/1984 | Siegrist et al. | 56/13.6 |
| 4,711,073 A | 12/1987 | Freier, Jr. et al. | 56/13.3 |
| 4,765,127 A | 8/1988 | Hamblen | 56/295 |
| 4,781,665 A | 11/1988 | Walker | 474/133 |
| 4,782,650 A | 11/1988 | Walker | 56/16.6 |
| 4,835,951 A | 6/1989 | Walker | 56/16.6 |
| 4,856,265 A | 8/1989 | Wolf | 56/320.2 |
| 4,916,887 A | 4/1990 | Mullet et al. | 56/13.8 |
| 4,930,981 A | 6/1990 | Walker | 415/119 |
| 5,012,633 A | 5/1991 | Ito et al. | 56/12.9 |
| 5,064,315 A | 11/1991 | Samejima et al. | 406/100 |
| 5,142,851 A | 9/1992 | Lydy et al. | 56/13.4 |
| 5,157,908 A | 10/1992 | Sebben et al. | 56/320.1 |
| 5,224,327 A | 7/1993 | Minoura et al. | 56/13.3 |
| 5,398,491 A | 3/1995 | Hartley | 56/320.2 |

(Continued)

FOREIGN PATENT DOCUMENTS

CH 658 363 11/1986

(Continued)

*Primary Examiner*—Árpád F Kovács

(57) ABSTRACT

A rear discharge mower deck has at least two cutting blades mounted on vertical spindles in cutting chambers, a fan in a housing mounted on the deck over the cutting chambers, and an inlet opening between the cutting chambers and the fan housing. The surface area of the inlet opening may be between about 50% and about 80% of the surface area within the fan diameter. A stripper plate may be on one edge of the inlet opening, and each cutting chamber may have an upwardly sloping tunnel to the inlet opening.

7 Claims, 2 Drawing Sheets

U.S. PATENT DOCUMENTS

| | | | |
|---|---|---|---|
| 5,542,243 A | 8/1996 | Yuki et al. | 56/13.3 |
| 5,560,188 A | 10/1996 | Murakawa et al. | 56/13.3 |
| 5,669,212 A | 9/1997 | Bening et al. | 56/13.3 |
| 5,826,416 A | 10/1998 | Sugden et al. | 56/320.2 |
| 5,832,708 A | 11/1998 | Sugden | 56/202 |
| 5,873,225 A | 2/1999 | Schaedler et al. | 56/13.3 |
| 5,960,616 A | 10/1999 | Schaedler et al. | 56/17.5 |
| 5,983,613 A | 11/1999 | Winter | 56/13.3 |
| 6,038,840 A | 3/2000 | Ishimori et al. | 56/13.3 |
| 6,065,276 A | 5/2000 | Hohnl et al. | 56/320.1 |
| 6,073,430 A | 6/2000 | Mullet et al. | 56/13.4 |
| 6,148,595 A | 11/2000 | Rabe et al. | 56/320.2 |
| 6,192,666 B1 | 2/2001 | Sugden et al. | 56/320.2 |
| 6,370,855 B1 | 4/2002 | Evans et al. | 56/320 |
| 6,434,918 B1 | 8/2002 | Csonka et al. | 56/13.4 |
| 6,609,358 B1 | 8/2003 | Schmidt et al. | 56/320.2 |
| 6,675,566 B2 | 1/2004 | Martignon | 56/13.3 |
| 2003/0024222 A1 | 2/2003 | Martignon | 56/6 |

FOREIGN PATENT DOCUMENTS

| | | |
|---|---|---|
| DE | 201 13 298 U 1 | 3/2002 |
| FR | 2 768 296 | 3/1999 |

REAR DISCHARGE MOWER DECK HAVING NON-VERTICAL FAN SPINDLE

This is a divisional and claims priority of application Ser. No. 11/250,584 filed 13 Oct. 2005, now U.S. Pat. No. 7,240,474 that application incorporated by reference in its entirety in this present application.

FIELD OF THE INVENTION

This invention relates to mowing machines for cutting grass and other vegetation, and more specifically to rear discharge mower decks with two or more cutting blades that discharge grass clippings into a collection container.

BACKGROUND OF THE INVENTION

Rotary mowers may have two or more cutter blades mounted to generally vertical shafts, with the cutter blades positioned under a mower deck. Rear discharge mower decks may utilize the "cut and throw" approach in which the blades throw cut grass clippings into a discharge chute which may be connected to a rear mounted collection container or bag.

Mower decks generate noise for a number of reasons. Turbulent air coming off each blade as it passes through the air under the deck creates a broadband sound. As each blade passes by geometric changes of the deck shell, it creates a tonal noise typically referred to as blade pass noise. The size of the "wing" or "lift" component of each blade is a large contributor to both turbulent and blade pass noise. The blade wings help lift the grass or vegetation off the ground surface to provide an even cut, and also help material flow (i.e., grass clippings) into a mower's material collection system. A large wing may improve the quality of cut and material flow, but also may create more noise. In recent years, there has been a greater need to reduce noise generated by grass mowing equipment. A rear discharge mower deck is needed that will provide an effective quality of cut and material flow, without increasing noise emissions.

Discharge chutes of rear discharge mower decks tend to plug up with grass clippings, especially while cutting heavy or thick grass. Additionally, grass clippings that are too small, and/or have sufficient mass, tend to accumulate in discharge chutes instead of being propelled through the chute into a collection container. A rear discharge mower deck is needed that has a discharge chute that is less likely to fill with grass clippings during use.

To help propel grass clippings through a discharge chute, fans or blowers have been proposed for use on grass mowing equipment. For example, U.S. Pat. Nos. 4,114,353, 5,224,327, 5,542,243, 6,192,666 and 6,675,566 relate to lawn mowers with fans to help blow clippings through a discharge chute into a hopper or grass catcher. Additionally, U.S. Pat. Nos. 5,873,225 and 5,960,616 relate to rear discharge decks positioned extremely close to the ground, with a radial fan formed integrally with the spindle of the cutting blade and opening near a discharge chute. U.S. Pat. No. 6,073,430 relates to a rotary mower having a fan chamber concentrically positioned over a cutting chamber to provide additional suction and to exhaust clippings through an exhaust passage over the deck.

SUMMARY OF THE INVENTION

A power assist rear discharge mower deck has at least two cutting blades in cutting chambers under the deck, and a fan in a blower housing mounted over the deck. An inlet opening is provided between the cutting chambers and the blower housing. The inlet opening has a front edge and a back edge, and a stripper plate may be mounted to the underside of the deck adjacent the front edge of the inlet opening. Part of the stripper plate may extend down from the top plate at an angle of between about 15 degrees and about 45 degrees. The inlet opening may have a surface area of between about 50% and about 80% of the surface area within the diameter of the fan.

The power assist rear discharge mower deck provides effective quality of cut and material flow, without excessive noise emissions. Additionally, the discharge chute of the power assist rear discharge mower deck is less likely than conventional mower decks to become filled or plugged with grass clippings during use.

DESCRIPTION OF THE PREFERRED EMBODIMENT

Power assist rear discharge mower deck 100 may be used in a variety of different mowing vehicles or walk-behind mowers, and in a variety of different mower configurations. For example, one, two, or more decks may be attached to a mowing vehicle. In one embodiment, power assist rear discharge mower deck 100 is a two-chamber deck; i.e., with two cutting blades and spindles; and may be positioned at or adjacent the front, middle, or rear of a mowing vehicle. However, in an alternative embodiment, the rear discharge mower deck may have three or more chambers, each chamber having a cutting blade attached to a spindle.

Figure 1:
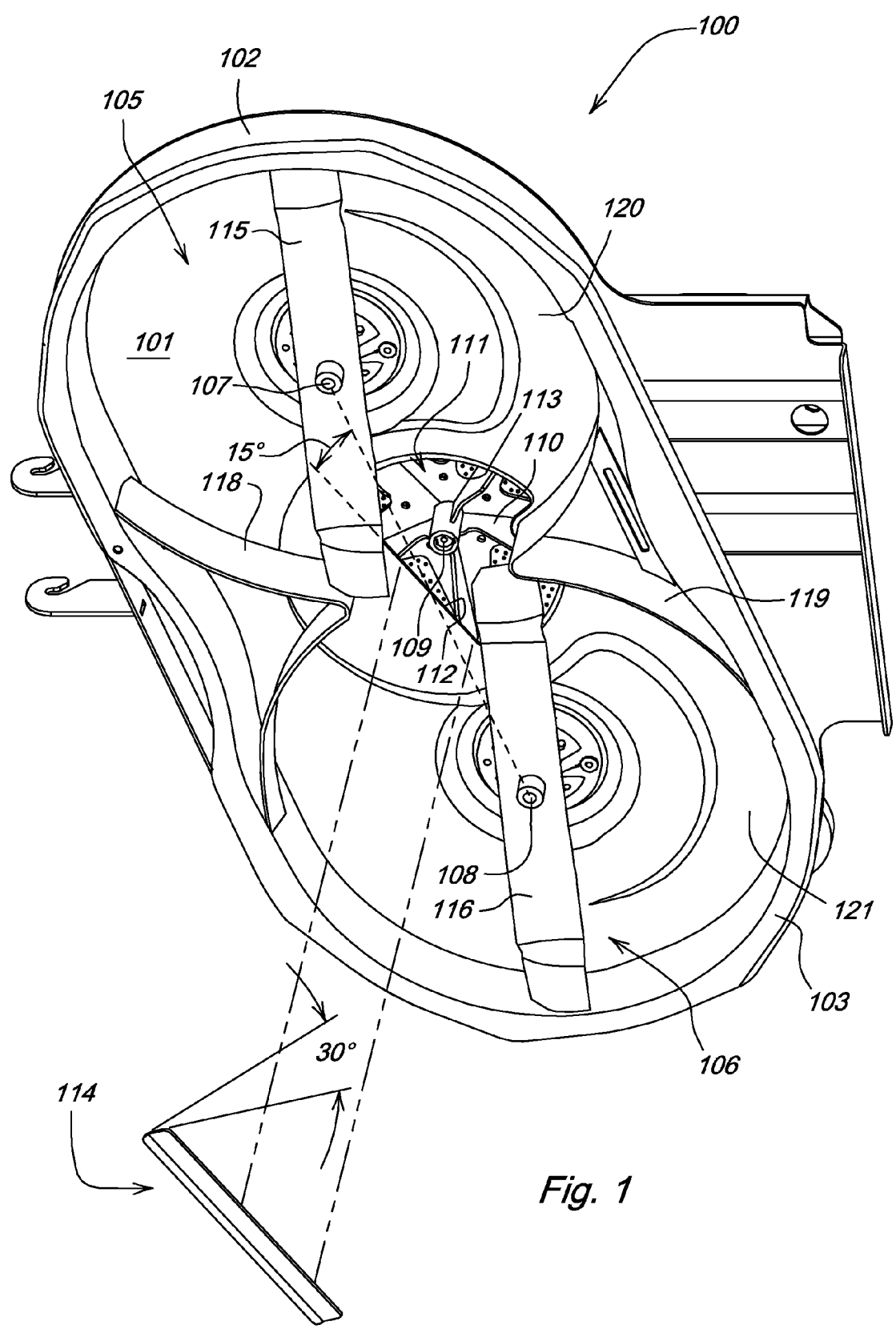
FIG. 1 is a perspective view of the underside of a power assist rear discharge mower deck in a first embodiment of the invention.
Figure 2:
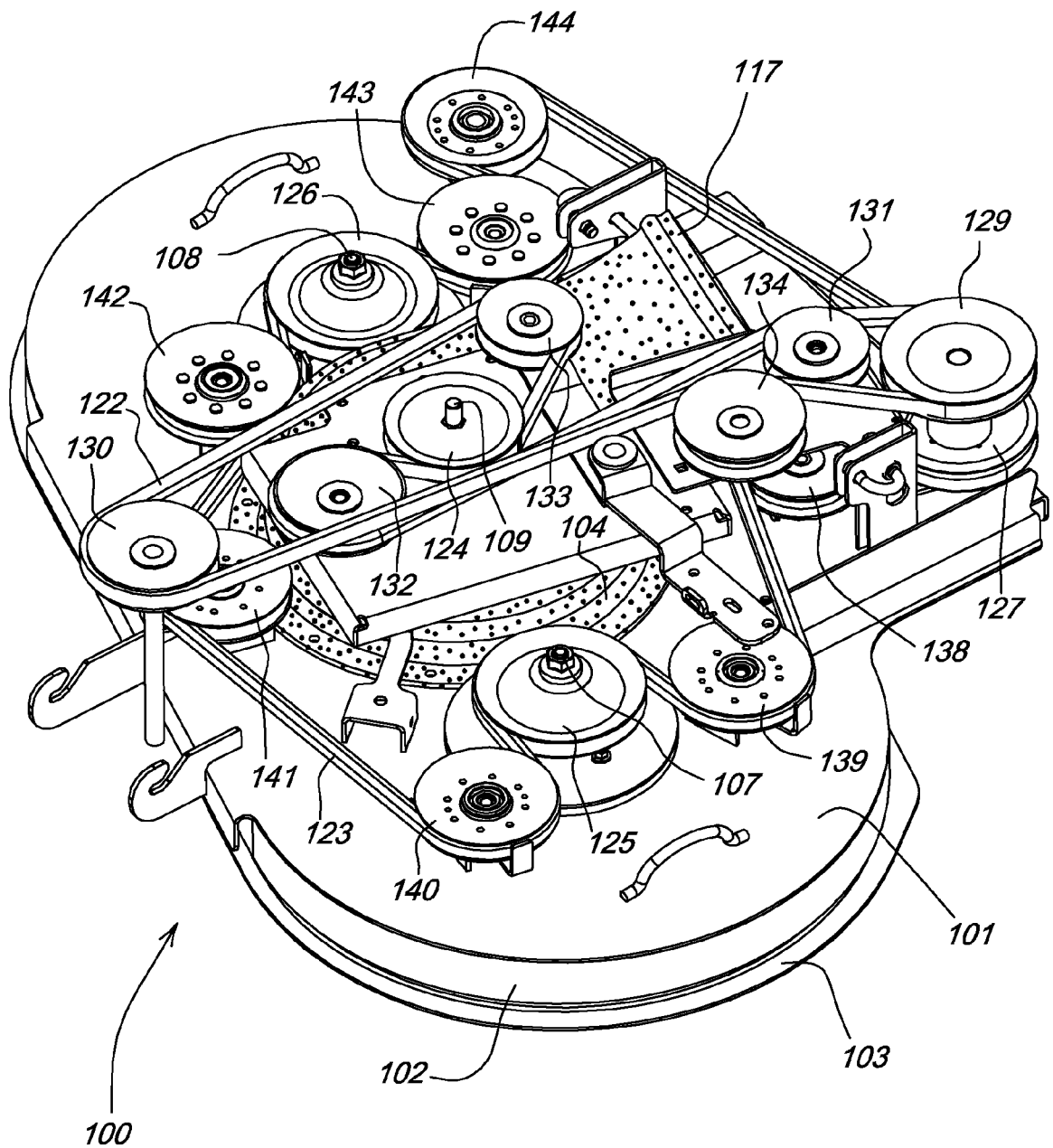
FIG. 2 is a rear perspective view of the top of a power assist rear discharge mower deck in a first embodiment of the invention.

In a first embodiment shown in FIGS. 1 and 2, the mower deck housing may include a top 101 that is generally horizontal. The top of the mower deck may be sheet metal or other rigid or semi-rigid material such as aluminum or plastic. Alternatively, the mower deck housing (including the top) may be cast as a unit. Or the top of the mower deck may be a single plate or a pair of plates, with the upper plate providing an outer or top surface and the lower plate providing an inner or bottom surface. At and around the rim or perimeter of top 101 may be downwardly depending sides 102. The sides may extend down from the top several inches to form cutting chambers, and preferably may extend down to a level at or slightly below the horizontal plane of the cutting blades in the chambers. The lower edges of the downwardly depending sides may be provided with a flange or outwardly flared lip 103.

In one embodiment, a left cutting chamber 105 and an adjoining right cutting chamber 106 may be positioned side-by-side under the top of the deck. Vertically aligned blade spindle 107 may extend through an opening in the top into the left cutting chamber under the deck, and vertically aligned blade spindle 108 may extend through an opening in the top into the right cutting chamber under the deck. The left cutting chamber and left blade spindle may be positioned slightly forwardly of the right cutting chamber and right blade spindle, so that there may be some overlap of the left and right cutting blades during mowing. Although two cutting chambers are preferred, the power assist rear discharge mower deck alternatively may include three or more cutting chambers.

In one embodiment, the blades of the power assist rear discharge mower deck may counter rotate. For example, when viewed from under the deck as shown in FIG. 1, left blade 115 may turn clockwise and right blade 116 may turn counterclockwise. As the cut grass clippings are brought to the center of the deck, the air streams from both blades join, causing the air flow and the volume of cut grass clippings to increase. It is preferred that the blades counter rotate, but the blades may rotate in the same direction in an alternative embodiment.

In one embodiment, inlet opening 111 is provided in the top of the power assist rear discharge mower deck above at least part of each of the cutting chambers. The surface area of inlet opening 111 may be smaller than the surface area within the diameter of the blades of fan 110, and preferably between about 50% and about 80% of the surface area within the fan diameter. For example, for a fan with a 8 inch diameter, the area within the fan diameter is about is about 50 square inches. The inlet opening should be between about 50% and about 80% of the area within the fan diameter, in this example between about 25 and about 40 square inches.

In one embodiment, inlet opening 111 may have a generally semi-circular or "D"-shape. More specifically, the inlet opening may have a first generally straight edge 112 and a second curved or rounded edge 113. The straight first edge may be positioned to face generally toward the front of the mower deck, and the curved second edge may be positioned to face generally toward the rear of the mower deck.

In one embodiment, the straight first edge of inlet opening 111 may be at an angle of between about 10 degrees and about 20 degrees, and preferably about 15 degrees, from a straight line drawn between the left and right cutting blade spindles 107, 108. At least part of the surface area of the inlet opening over the left cutting chamber may be closer to the front of the deck than any part of the inlet opening over the right cutting chamber. This alignment of the inlet opening is preferred for mower decks having one cutting chamber positioned slightly in front of the other cutting chamber. In general, the inlet opening may be configured and oriented so that the first or front edge of the inlet opening above the forward cutting chamber is closer to the front of the deck than the first or front edge of the inlet opening above the rearward cutting chamber. The disclosed inlet opening configuration best matches the flow streams of grass for decks having two cutting blades, with one cutting blade positioned slightly in front of the other. Additionally, the disclosed inlet opening shape helps to optimize inlet velocity for grass clippings in areas around inlet opening 111, and to minimize negative velocity of grass clippings; i.e., blowback; in other areas.

In one embodiment, stripper plate 114 may be mounted to the underside of top 101 at or near one edge of inlet opening 111. For example, the stripper plate may be welded or bolted to the underside of the mower deck along the straight first or front edge 112 of inlet opening 111. As the counter rotating blades propel grass clippings from the back of the deck toward the front of the deck, the stripper plate may help direct the clippings into the inlet opening. The stripper plate may slow down the grass clippings sufficiently so that they may be better drawn into the fan or impeller 110. The stripper plate may extend down from the underside of top 101 about ¼ inch to about 1 inch, and preferably drops down about ⅝ inch below the underside of the top of the deck. At least part of the stripper plate may be at an angle of between about 15 degrees and about 45 degrees from the horizontal surface of the top, and preferably about 30 degrees from horizontal as shown in FIG. 1. The lower edge of the stripper plate may be within about ½ inch, or less, of the horizontal planes defined by the rotation of the cutting blades.

In one embodiment, blower housing 104 may be mounted onto the top of the power assist rear discharge mower deck directly above inlet opening 111. Rotary fan 110 may be mounted on fan spindle 109 in the blower housing above inlet opening 111. The blower housing may have an outlet 117 facing toward the rear of the mower deck so that it may be removably connected to a collection container or bag (not shown).

In one embodiment, the blower housing may be tilted at an angle from the horizontal top of the deck. More specifically, the rear of the blower housing may be tilted up (or raised slightly) with respect to the front of the blower housing, preferably at an angle of between about one degree and about five degrees from the horizontal top of the deck. Tilting the blower housing helps grass clippings enter into the blower housing instead of passing by the inlet opening. Fan spindle 109 also may be at an angle of between about one degree and about five degrees from vertical. Additionally, fan spindle 109 may be located at or near a line drawn between the left and right blade spindles, but may be offset from the midpoint on that line so that it is located slightly closer (i.e., about 6 mm) to the left blade spindle.

In one embodiment, as shown in FIG. 2, the blade spindles 107, 108 and fan spindle 109 each may have a pulley mounted to its upper end, and may be turned by a belt. For example, first or upper belt 122 may turn pulley 124 mounted to the fan spindle, and second or lower belt 123 may turn pulleys 125, 126 mounted to the blade spindles. A power take off clutch 130 may drive the upper belt through pulley 129, which also may drive the lower belt through pulley 127. Pulleys 131-134 may be mounted on or over the top of the deck to provide needed tension and direct upper belt 122 to turn the fan spindle pulley in the desired rotational directions. Pulleys 138-144 may be mounted on or over the top of the deck to provide needed tension and route the lower belt 123 to turn the blade spindle pulleys in the desired rotation. Specifically, pulleys 125, 126 and 138-144 may be arranged to counter-rotate the left and right blade spindles, and pulleys 138-144 may be mounted near the perimeter of the deck to provide adquate clearance between the lower belt and the blower housing.

In one embodiment, the underside of the power assist rear discharge mower deck may include a pair of V-shaped baffle plates 118, 119, one baffle adjacent the front of the deck and one baffle adjacent the rear of the deck. The V-shaped baffles may help define the generally cylindrical shapes of the left and right cutting chambers. The underside of top 101 also may include raised tunnel 120 forming an arcuate path between left cutting chamber 105 and inlet opening 111, and a corresponding raised tunnel 121 forming an arcuate path between right cutting chamber 106 and inlet opening 111. Each raised tunnel may provide a path around part of the perimeter of each cutting chamber, and preferably about 180 degrees of the perimeter. Additionally, each raised tunnel may provide an upwardly sloping surface under the top of the deck toward the inlet opening. Each raised tunnel may help guide grass clippings from the cutting chamber toward the inlet opening. The upward slope of the tunnel results in a pressure change which helps keep the grass clippings at or near the top of the deck. Suspending the grass near the top of the deck reduces or minimizes the vacuuming effect required from the fan.

Having described the preferred embodiment, it will become apparent that various modifications can be made without departing from the scope of the invention as defined in the accompanying claims.

The invention claimed is:

1. An apparatus comprising:
    a rear discharge mower deck having a top, at least two cutting chambers under the top, and at least two counter-rotating rotary blades in the cutting chambers; the blades mounted on generally vertical blade spindles;
    an inlet opening in the top above both the cutting chambers; and
    a blower mounted on the top above the inlet opening to a non-vertical fan spindle.

2. The apparatus of claim 1 wherein at least part of the surface area of the inlet opening above one of the cutting chambers is positioned forwardly of any of the surface area of the inlet opening above another cutting chamber.

3. The apparatus of claim 1 further comprising an upwardly sloped surface between each cutting chamber and the inlet opening.

4. The apparatus of claim 1 further comprising a stripper plate on the underside of the top adjacent a forward edge of the inlet opening.

5. An apparatus comprising:
    a mower deck having at least two counter-rotating cutting blades mounted on vertical spindles, each cutting blade rotating within a cutting chamber adjoining the cutting chamber of another blade;
    a fan in a housing mounted on the deck over the cutting chambers, the fan mounted on a non-vertical spindle; and
    an inlet opening between the cutting chambers and the fan housing, the inlet opening being above at least part of each of the cutting chambers.

6. The apparatus of claim 5 further comprising an upwardly sloped surface between each cutting chamber and the inlet opening.

7. The apparatus of claim 5 further comprising a stripper plate adjacent the forward edge of the inlet opening.

* * * * *